(12) United States Patent
Bowen

(10) Patent No.: US 7,992,117 B2
(45) Date of Patent: Aug. 2, 2011

(54) SYSTEM AND METHOD FOR DESIGNING A COMMON CENTROID LAYOUT FOR AN INTEGRATED CIRCUIT

(75) Inventor: C. Trevor Bowen, Athens, AL (US)

(73) Assignee: ADTRAN, Inc., Huntsville, AL (US)

( * ) Notice: Subject to any disclaimer, the term of this patent is extended or adjusted under 35 U.S.C. 154(b) by 300 days.

(21) Appl. No.: 11/734,376

(22) Filed: Apr. 12, 2007

(65) Prior Publication Data

US 2007/0294652 A1    Dec. 20, 2007

Related U.S. Application Data

(60) Provisional application No. 60/815,028, filed on Jun. 20, 2006, provisional application No. 60/838,084, filed on Aug. 16, 2006.

(51) Int. Cl.
*G06F 17/50* (2006.01)

(52) U.S. Cl. ........................... 716/119; 716/135

(58) Field of Classification Search ............ 716/2, 8–12, 716/119, 135
See application file for complete search history.

(56) References Cited

U.S. PATENT DOCUMENTS

| | | | |
|---|---|---|---|
| 5,963,975 A | 10/1999 | Boyle et al. | |
| 6,954,167 B2 | 10/2005 | Leung | |
| 7,118,273 B1* | 10/2006 | Schnaitter | 374/168 |
| 2004/0031005 A1* | 2/2004 | Yunoki | 716/8 |
| 2005/0273748 A1* | 12/2005 | Hetzel et al. | 716/14 |
| 2006/0026547 A1 | 2/2006 | Aggarwal | |
| 2006/0057840 A1 | 3/2006 | Kerr et al. | |
| 2007/0234246 A1 | 10/2007 | Sinha et al. | |

OTHER PUBLICATIONS

Alan Hastings, "The Art of Analog Layout," by Prentince-Hall, Inc., pp. 231-257, 426-442, 2001.
Lopez, et al., "Layout-constrained Retargeting of Analog Blocks," Instituto de Microelectonica de Sevilla, Centro Nacional de Microelectonica Edif. CICA, Avda.
Hartono, et al., "Active Device Generation for Automatic Analog Layout Retargeting Tool," UWEE Technical Report No. UWEETR-2004-0015, May 13, 2004, pp. 1-36.
Bruce, et al., "Analog Layout Using ALAS!," IEEE Journal of Solid-State Circuits, vol. 31, No. 2, Feb. 1996, pp. 271-274, 1364-1365.

(Continued)

*Primary Examiner* — Vuthe Siek
(74) *Attorney, Agent, or Firm* — Lanier Ford Shaver & Payne, P.C.; Jon E. Holland

(57) ABSTRACT

An exemplary common centroid layout design system receives various inputs about an integrated circuit (IC) design. Based on such inputs, the system calculates a common centroid unit, which represents an array of segments of each device in the IC design. The number of segments for each device within the common centroid unit is selected based on the respective sizes of the devices. The common centroid unit is then tiled to automatically define the complete layout for the IC object. The system selects an algorithm for tiling the common centroid unit based on the size of such unit such that, upon completion of the tiling process, all of the devices have a common centroid. In other words, the system selects an algorithm for tiling such that a common centroid layout design is generated. Using the common centroid layout design, the IC object can be manufactured so that it is immune to linear process gradients and more resistant to non-linear gradients relative to ICs that do not have a common centroid layout design.

32 Claims, 11 Drawing Sheets

```
            ┌72
73 74 75 76 77 78 79 80
┌─┬─┬─┬─┬─┬─┬─┬─┐
│2│1│2│0│2│2│1│2│
└─┴─┴─┴─┴─┴─┴─┴─┘
```

```
              ┌81
    ┌─┬─┬─┬─┬─┬─┬─┐
  a │2│1│2│0│2│2│1│2│
    ├─┼─┼─┼─┼─┼─┼─┤
  b │2│1│2│2│0│2│1│2│
    └─┴─┴─┴─┴─┴─┴─┘
```

OTHER PUBLICATIONS

Sayed, et al., "Automatic Generation of Common-Centroid Capacitor Arrays with Arbitrary Capacitor Ratio," Proceedings of the 2002 Design, Automation and Test in Europe Conference and Exhibition, IEEE, 2002.

Long, et al., "Optimal Two-Dimension Common Centroid Layout Generation for MOS Transistors Unit," Dept. of Computer Science and Technology, Tsinghua University, Beijing, China.

Baker, et al., "CMOS Circuit Design, Layout, and Simulation," IEEE Press Series on Microelectronic Systems, 1998, pp. 134-141, 446-449.

Bowen, U.S. Appl. No. 11/840,050, entitled, "Deterministic System and Method for Generating Wiring Layouts for Integrated Circuits," filed Aug. 16, 2007.

Long, et al., "Optimal Two-Dimension Common Centroid Layout Generation for MOS Transistors Unit-Circuit," Department of Computer Science and Technology, Tsinghua University, 2005, pp. 2999-3002.

Lai, et al., "DTA: Layout Design Tool for CMOS Analog Circuit," The 2004 IEEE Asia-Pacific Conference on Circuits and Systems, Dec. 6-9, 2004, pp. 537-540.

* cited by examiner

91

| Segment Identity | A | B | C | D | E |
|---|---|---|---|---|---|
| Number of Appearances | 1 | 3 | 3 | 3 | 2 |

92

| Number of Appearances | 1 | 2 | 3 |
|---|---|---|---|
| Segment Identity | A | E | B, C, D |

93

| Number of Appearances | 1 | 2 | 3 |
|---|---|---|---|
| Count | 1 | 1 | 3 |

| 2 | 1 | 2 | 0 | 2 | 2 | 1 | 2 | 2 | 1 | 2 | 0 | 2 | 2 | 1 | 2 |
| 1 | 2 | 0 | 2 | 2 | 1 | 2 | 2 | 1 | 2 | 0 | 2 | 2 | 1 | 2 | 2 |
| 2 | 0 | 2 | 2 | 1 | 2 | 2 | 1 | 2 | 0 | 2 | 2 | 1 | 2 | 2 | 1 |

| 2 | 1 | 2 | 0 | 2 | 2 | 1 | 2 | 2 | 1 | 2 | 0 | 2 | 2 | 1 | 2 |
| 1 | 2 | 0 | 2 | 2 | 1 | 2 | 2 | 1 | 2 | 0 | 2 | 2 | 1 | 2 | 2 |
| 2 | 0 | 2 | 2 | 1 | 2 | 2 | 1 | 2 | 0 | 2 | 2 | 1 | 2 | 2 | 1 |
| 1 | 2 | 2 | 1 | 2 | 2 | 0 | 2 | 1 | 2 | 2 | 1 | 2 | 2 | 0 | 2 |
| 2 | 2 | 1 | 2 | 2 | 0 | 2 | 1 | 2 | 2 | 1 | 2 | 2 | 0 | 2 | 1 |
| 2 | 1 | 2 | 2 | 0 | 2 | 1 | 2 | 2 | 1 | 2 | 2 | 0 | 2 | 1 | 2 |

FIG. 12

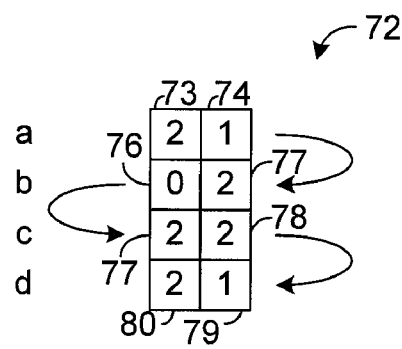
FIG. 17
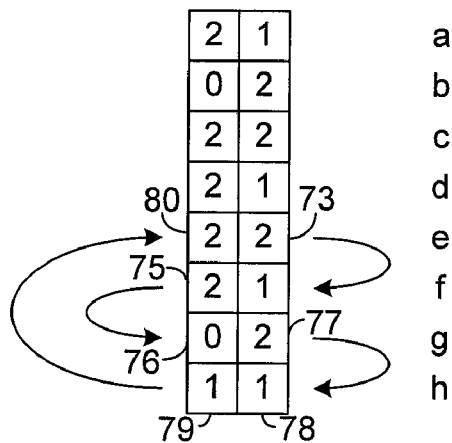
FIG. 18
FIG. 19

US 7,992,117 B2

SYSTEM AND METHOD FOR DESIGNING A COMMON CENTROID LAYOUT FOR AN INTEGRATED CIRCUIT

CROSS REFERENCE TO RELATED APPLICATIONS

This application claims priority to U.S. Provisional Patent Application No. 60/815,028, entitled "Automatic Generation of Common-Centroid Arrays," and filed on Jun. 20, 2006, which is incorporated herein by reference. This application also claims priority to U.S. Provisional Patent Application No. 60/838,084, entitled "A Systematic Method for Wiring Common-Centroid Cells," and filed on Aug. 16, 2006, which is incorporated herein by reference.

RELATED ART

Imperfections in manufacturing of an integrated circuit (IC) chip may result in some parameters varying either linearly or non-linearly along the surface of the chip. Such variations may adversely affect tolerances and/or create mismatches within the IC chip. As an example, it is well-known that, for a unity-gain current mirror, the input current ideally should equal the output current. To achieve this affect, the transistors of a current mirror are typically designed to have the same characteristics, but variations in the manufacturing process may cause a mismatch between transistors, thereby causing the output current to slightly differ from the input current. Generally, the greater the mismatch, the greater is the current difference. Moreover, it is generally desirable to minimize the effects of process variations so that IC chip components can exhibit improved tolerances.

Previously, common centroid layout techniques have been used in an effort to mitigate manufacturing variations. In using such techniques, the layout of the devices of an IC object is carefully controlled such that each device shares the same centroid, also known as the center of mass. In the context of this document, an "IC object" is any collection of interconnected devices that collectively perform a desired function on an IC chip, and a "device" is a discrete component of an object. For example, an "object" may be a power amplifier that is configured to amplify an input signal such that the amplifier's output signal exhibits a gain relative to the input signal, and a "device" of the power amplifier may be a transistor. Using common centroid layout techniques, the transistors of such power amplifier would be arranged such that the centroid of each transistor is located at the same point. In other words, each transistor shares a common centroid. Typically, each segment of the same IC object is adjacent to another segment of the IC object, but other arrangements of the segments are possible.

When the devices of an object share a common centroid, the effects of process variations tend to cancel thereby improving tolerances. Manually creating a common centroid layout for an IC chip can be burdensome and time consuming. Indeed, a single IC chip may have thousands upon thousands of objects, many of which are of different types and/or configurations.

Thus, attempts have been made to automate common centroid layout design. Unfortunately, automating this process has proven difficult. Generally, previous systems for generating common centroid layout designs have been complex and capable of successfully handling only a limited number of types. Further, many layout designers have been reluctant to use such systems because they do not trust these systems to generate an accurate common centroid layout for each object using complex and computationally expensive algorithms. Accordingly, previous systems for automating creation of common centroid layout designs have, in general, achieved only limited success.

Moreover, improved systems and methods for automatically generating common centroid layout designs are generally desirable.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 6 is a block diagram illustrating various tables that may be used by the system of FIG. 3 to evenly distribute device segments in a common centroid.

FIG. 11 is a block diagram illustrating an exemplary array portion that may be created by a layout design system, such as is depicted in FIG. 3, using the common centroid unit of FIG. 5 according to a tiling algorithm described in FIG. 10.

FIG. 12 is a block diagram illustrating a completed array based on the array portion depicted by FIG. 11.

FIG. 17 is a block diagram illustrating the common centroid unit after it has been broken according to an exemplary embodiment of the present disclosure.

FIG. 18 is a block diagram illustrating the common centroid unit after it has been broken according to an exemplary embodiment of the present disclosure.

FIG. 19 is a block diagram illustrating the an exemplary array generated using the common centroid unit depicted by FIG. 19.

DETAILED DESCRIPTION

The present disclosure generally pertains to systems and methods for automatically generating common centroid layout designs for integrated circuits (ICs). A system for designing a common centroid layout in accordance with an exemplary embodiment of the present disclosure receives various inputs, such as the number of devices and size of each device, pertaining to the circuit design for at least one IC object. Based on such inputs, the system calculates a common centroid unit, which represents an array of device segments. (The number of segments for each device within the common centroid unit is selected based on the respective sizes of the devices.) The common centroid unit is then tiled to automatically define the complete layout for the object. The system selects an algorithm for tiling the common centroid unit based on the size of this unit such that, upon completion of the tiling process, all of the devices have a common centroid (i.e., have a center of mass located at the same point). In other words, the system selects an algorithm for tiling such that a common centroid layout design is generated. Using the common centroid layout design, the IC object can be manufactured so that it is substantially immune to linear process gradients and more resistant to non-linear gradients relative to IC objects that do not have a common centroid layout design.

Figure 1:
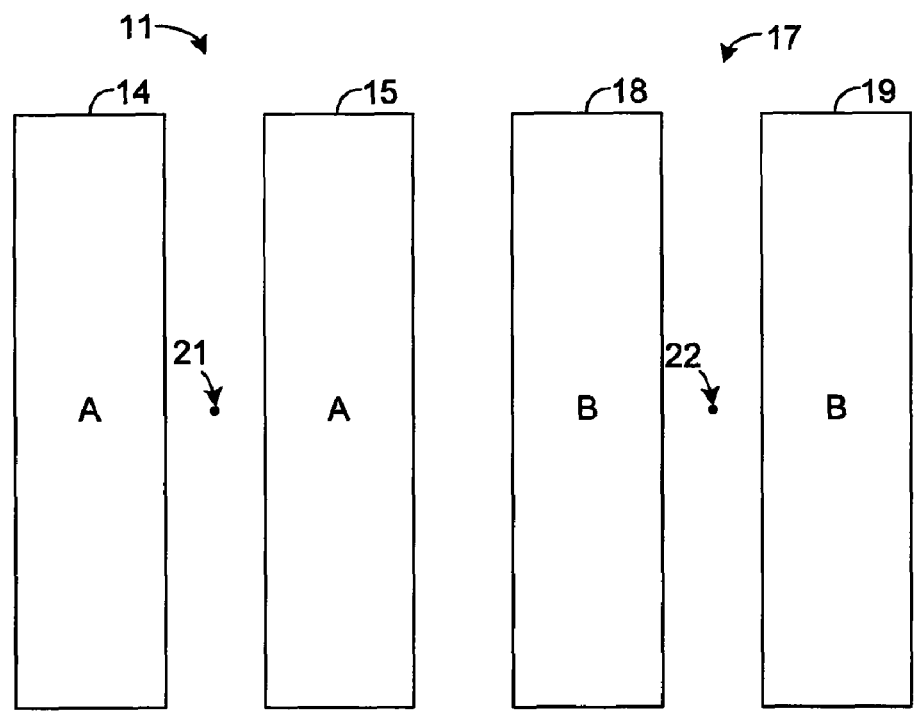
FIG. 1 depicts exemplary device segments that do not have a common centroid.
Figure 2:
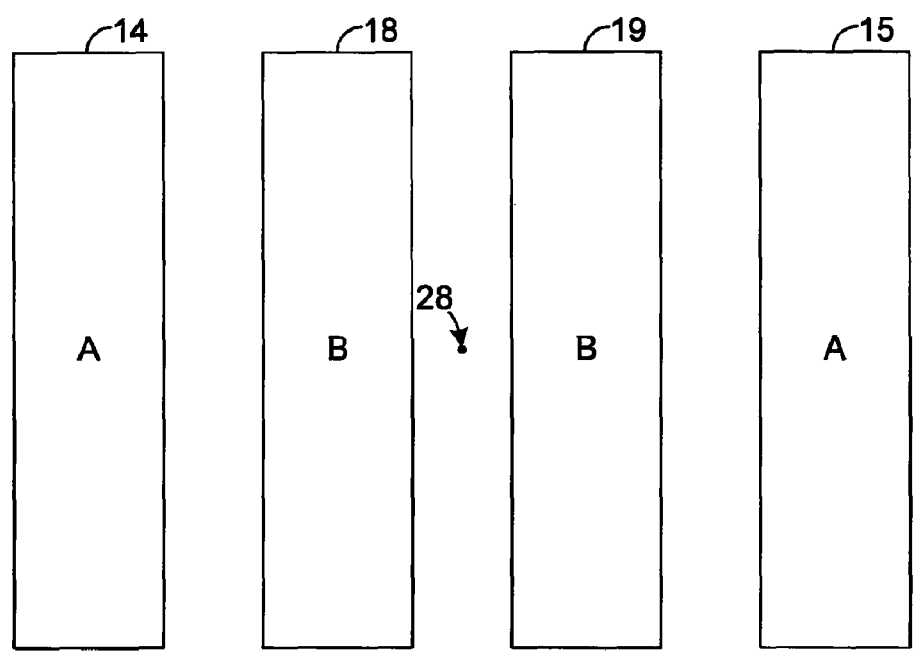
FIG. 2 depicts exemplary device segments that have a common centroid.

To illustrate general principles of common centroid layout design, refer to FIGS. 1 and 2. FIG. 1 shows a first device 11, referred to as "device A," of two equally sized segments 14 and 15 and another device 17, referred to as "device B," of two equally sized segments 18 and 19. As a mere example, device A may be a transistor of an object, such as a power amplifier, and device B may be another transistor of the same object. The object may comprise other devices that are not shown in FIG. 1 for simplicity. As shown by FIG. 1, the center of mass of device A is at point 21, and the center of mass of device B is at point 22. Since the centers of mass of the two devices are not co-located, FIG. 1 does not show a common centroid layout design for devices A and B. Therefore, if devices A and B are formed on an IC chip in the manner shown by FIG. 1, linear process variations along a length of the chip would likely affect one of the devices A or B much greater than the other device.

If, on the other hand, the same two devices A and B are arranged as shown by FIG. 2, then the centers of mass of the two devices would be co-located. In this regard, the center of mass of each device A and B in FIG. 2 is located at point 28. Thus, FIG. 2 represents a common centroid layout design for devices A and B. Accordingly, if devices A and B are formed on an IC chip in the manner shown by FIG. 2, the effects of linear process variations along a length of the chip would likely cancel and, therefore, have a much less impact, if any, on tolerances and performance as compared to the layout design of FIG. 1.

Figure 3:
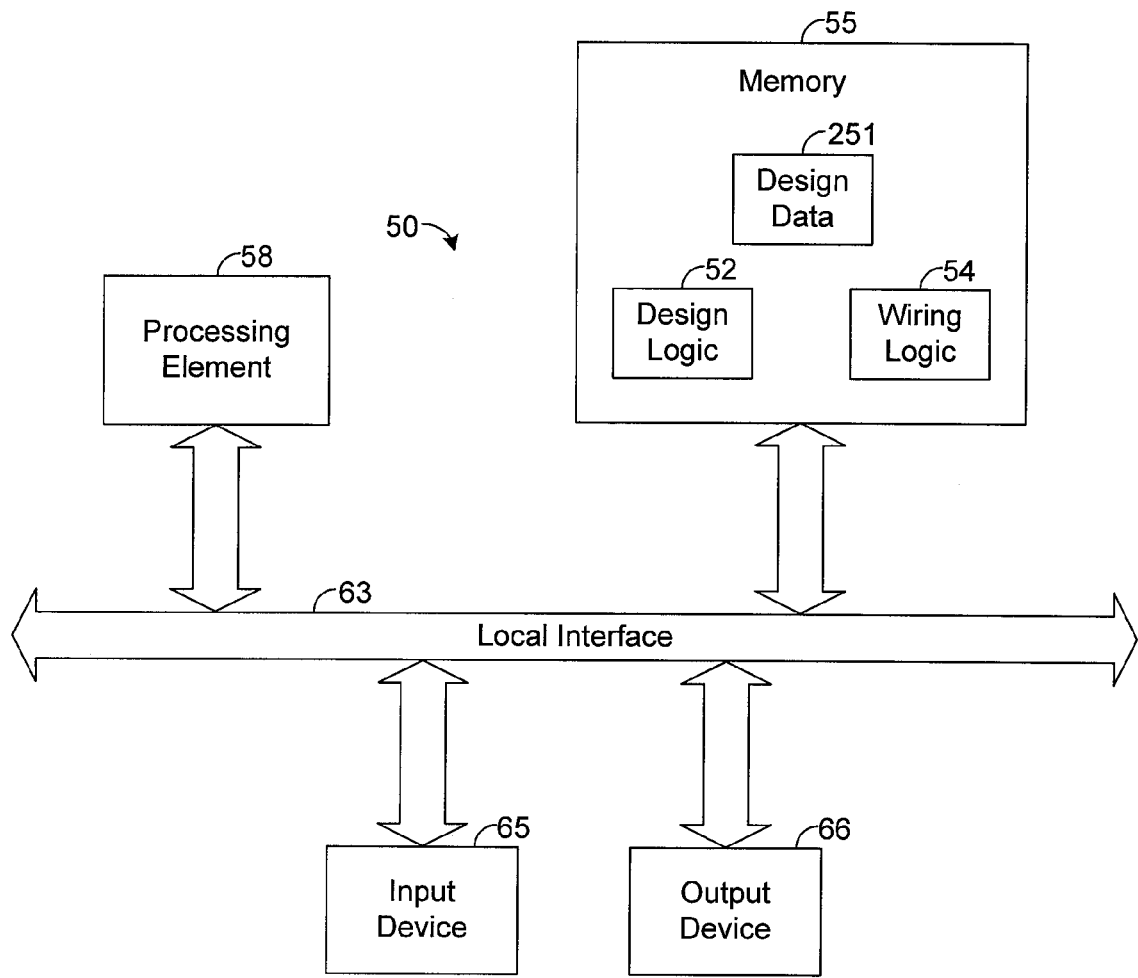
FIG. 3 is a block diagram illustrating a system for designing a common centroid layout in accordance with an exemplary embodiment of the present disclosure.

FIG. 3 depicts an exemplary embodiment of a system 50 for automatically generating a common centroid layout for a circuit design. In this regard, design logic 52, based on various input, such as the number and sizes of devices for a circuit object, is configured to determine an arrangement of device segments that ensures each device has a common centroid. The design logic 52 can be implemented in software, hardware, or a combination thereof. In the exemplary embodiment illustrated in FIG. 3, the design logic 52 is implemented in software and stored in memory 55.

Note that the design logic 52, when implemented in software, can be stored and transported on any computer-readable medium for use by or in connection with an instruction execution apparatus that can fetch and execute instructions. In the context of this document, a "computer-readable medium" can be any means that can store a program for use by or in connection with an instruction execution apparatus.

The exemplary embodiment of the system 50 depicted by FIG. 3 comprises at least one conventional processing element 58, such as a central processing unit (CPU), that communicates to and drives the other elements within the system 50 via a local interface 63, which can include at least one bus. Furthermore, an input device 65, for example, a keyboard or a mouse, can be used to input data from a user of the system 50, and an output device 66, for example, a printer or display device, can be used to output data to the user. Moreover, just about any conventional computer system may be used to implement the embodiment shown by FIG. 3 by storing the design logic 52 in such computer system and then providing the design logic 52 with access to various inputs, as will be described in more detail hereafter.

The design logic 52 is configured to receive information indicative of a circuit design of at least one desired object and to then automatically generate a common-centroid layout for the object. For example, assume that a circuit designer provides a design of the current mirror circuit 63 depicted by FIG. 4. In such an example, the object has three devices 0-2, which are transistors. For illustrative purposes, assume that the widths (in the x-direction) of devices 0-2 are 12.5, 25, and 62.5 microns, respectively, and the heights (in the y-direction) are equal. Thus, device 1 is twice as large as device 0, and device 2 is five times larger than device 0.

The design logic 52 is configured to segment each device 0-2 into equally sized segments and then arrange the segments such that the arrangement of all segments forms a rectangular array, each segment is adjacent with another segment of the devices 0-2, and each device 0-2 shares a common centroid. Other shapes for the array are possible in other embodiments.

In one exemplary embodiment, the design logic 52 achieves the foregoing by defining a common-centroid unit, which represents a set of segments for each device 0-2, and then tiling the common centroid unit until the desired device sizes are realized. Further, the algorithm for tiling the common centroid unit is selected such that the resulting layout has a common centroid for each device 0-2.

Unless otherwise specified by a user, the common centroid unit (CCU) is defined as a single row of segments. Further, the number of segments of each device 0-2 within the CCU is dependent on the respective size of each device 0-2. For example, in one exemplary embodiment, the design logic 52 is configured to calculate the greatest common factor (GCF) for the device sizes (i.e., the largest floating-point number that can be evenly divided into each device width). In the instant example, the GCF is 12.5. The design logic 52 then divides the device size of each device 0-2 by the GCF. The result is the number of segments to be included in the CCU for the respective device. In the instant example, dividing the size (i.e., 12.5) of device 0 by the GCF (i.e., 12.5) yields 1. Further, dividing the size (i.e., 25) of device 1 by the GCF yields 2, and dividing the size (i.e., 62.5) of device 2 by the GCF yields 5. Thus, the design logic 52 is configured to define the CCU with one segment of device 0, two segments of device 1, and five segments of device 2. Note that each segment is equally sized in the instant embodiment, although non-uniform segment sizes may be possible in other embodiments.

Figure 4:
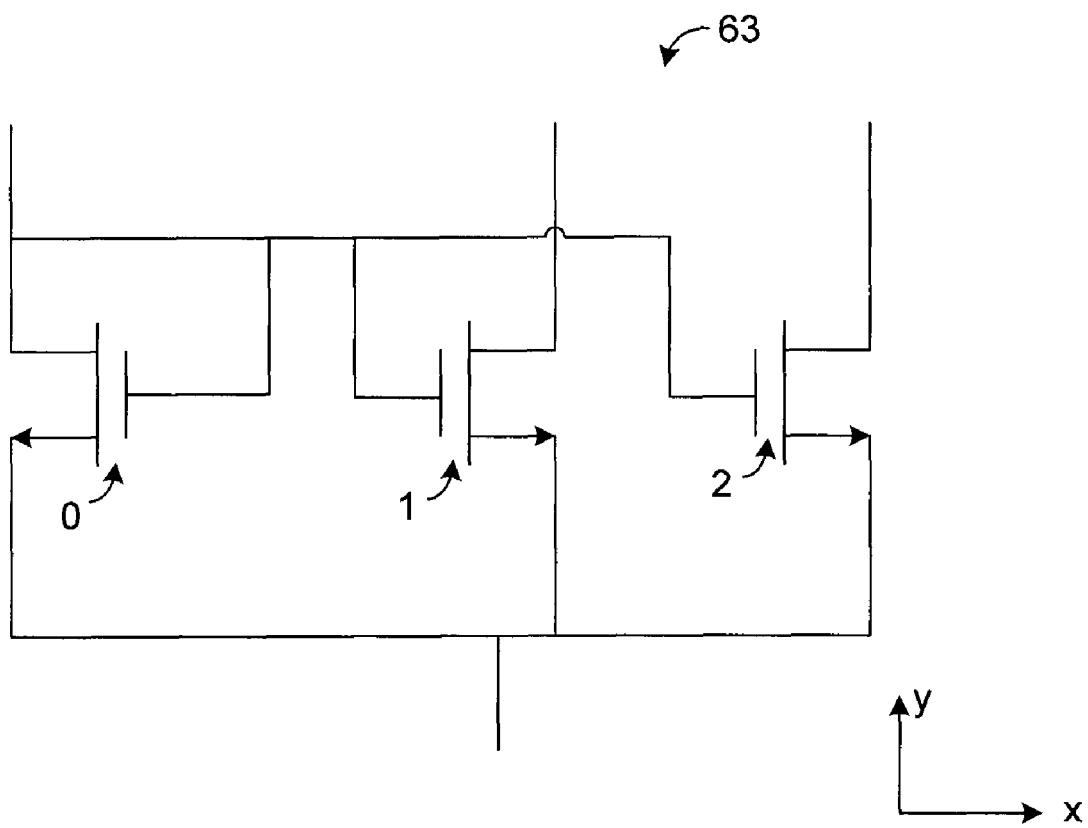
FIG. 4 is a circuit diagram illustrating an exemplary circuit design to be processed by the layout design system of FIG. 3.
Figure 5:
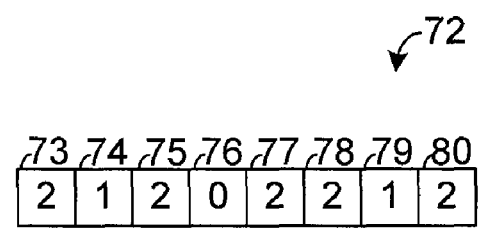
FIG. 5 is a block diagram illustrating en exemplary common centroid unit generated for the circuit design depicted by FIG. 4.

Thus, an exemplary CCU 72 for the circuit 63 of FIG. 4 is depicted in FIG. 5. As shown by FIG. 5, the CCU 72 in the instant example has eight segments 73-80. Further, the reference number inside each segment 73-80 indicates which device 0-2 the segment belongs. For example, inside of segment 73 is the number "2," which indicates that the segment is for device 2. Similarly, inside of segment 74 is the number "1," which indicates the segment is for device 1, and inside of segment 76 is the number "0," which indicates that the segment is for device 0. Further, inside of each of the segments 75, 77, 78, and 80 is the number "2," which indicates that these segments are for device 2, and inside of segment 79 is the number "1," which indicates that the segment is for device 1.

In one exemplary embodiment, the design logic 52 is configured to arrange the segments 73-80 such that they are distributed in a relatively even manner. Ideally, each segment of the same device is separated as much as possible by segments of other devices. Generally, the more that the segments of the same device are distributed throughout the CCU, the better the resulting layout should resist non-linear process variations. However, even distribution of the segments in the CCU is unnecessary to generate a layout having a common centroid according to the techniques described herein. In addition, there are various techniques that may be used to distribute the segments across the CCU. An exemplary algorithm for evenly distributing segments within the CCU will now be described in more detail below.

In this regard, the design logic 52 starts by defining an input vector, which represents all of the segments to be evenly distributed. The vector has a component for each device segment. For example, assume a new, separate case, where there are four devices, A, B, C, and D, and where there are 13 segments (e.g., one segment for device A; three segments for each of the devices B, C, and D; and two segments for device E). An input vector may be defined as follows, where each component of the vector represents a device segment: (A, B, B, B, C, C, C, D, D, D, E, E). The order of the vector components may be arbitrary at this point. However, in one exemplary embodiment, the devices are ranked in order of importance, as indicated via user input, and are placed in the vector based on such ranking from left to right. For example, in the foregoing vector, the component for device A occupies the leftmost position indicating that, out of all of the devices, it is most important for device A to be free of non-linear process variations. The components for device B are positioned after the component for device A, indicating that, out of all of the devices except for device A, it is most important for device B to be free of non-linear process variations. Further, the components for device E occupy the last positions of the vector indicating that, out of all of the devices, it is least important for device E to be free of non-linear process variations. In the nomenclature used herein, the foregoing ranking is indicated by the letter value assigned to the device where a more important device is assigned a lower letter as its segment identity. For example, "A" is lowest value of the alphabet and is, therefore, assigned to the device for which it is most important to be free of non-linear process variations. Further, since "B" is lower than "C," it is more important for device B to free of non-linear process variations than device C.

Based on the input vector, the design logic 52 successfully defines three different tables, where each new table is based on a preceding table of the input vector. For example, a table, referred to as "count," is defined that represents an accumulation or counting of the number of appearances of each segment type in the input vector, keyed according to segment identity. In the instant example, the design logic 52 may define count as follows (1 A, 3 B's, 3 C's, 3 D's, 2 E's). The table, count, in the current example is represented as table 91 in FIG. 6. Then, based on table 91, the design logic 52 defines a table, referred to as "likeCount," that represents a grouping of all segment types that have the same number of appearances, keyed according to the number of appearances. In the instant example, the design logic 52 may define likeCount as follows: (1 appearance=A, 2 appearances=E, 3 appearances= (B, C, D)). The table, likeCount, in the current example is represented as table 92 in FIG. 6. Based on table 92, the design logic 52 defines a table, referred to as "sizeOfLikeCounts," that represents a counting of the number of segment types that have the same number of appearances, keyed according to the number of appearances. In the instant example, the design logic 52 may define sizeOfLikeCounts as follows: (one appearance=1, two appearances=1, 3 appearances=3). The table, sizeOfLikeCounts, in the current example is represented as table 93 in FIG. 6.

The design logic 52 orders the values in each entry of the likeCount table such that lowest value is placed in the center and the other values of the entry are placed in alternating order to the sides of the center. In this regard, only one entry of the likeCount table 92 has more than one segment identity value. Such entry has the identities (B, C, D). Thus, the values in this entry are reorder as (C, B, D). If, instead of having the identity values (B, C, D), the entry has the identity values A-F, then the entry could be reordered as (G, E, C, A, B, D, F). Such reordering is unnecessary but helps to ensure that the lower valued segments are more likely to be better distributed and, therefore, more resistant to non-linear process variations.

A last index is initialized to the number of segments in the input vector minus 1. The first index is initialized to zero, and the center position is calculated as being the last index divided by 2.

Further, two vectors are initialized. The first vector is a temporary vector, which is used to hold the intermediate results, and the second vector is to hold the final results.

The appearance numbers (keys of the likeCount table) are then processed in ascending order, giving preference to the least populous segment type (i.e., the lowest segment identity value). For each appearance number, the ideal period is calculated so that the segment type can be placed at twice the frequency across the whole vector. As a nested processing loop, multiple place holders (one for each segment that shares the same number of appearances, which is the value of sizeOfLikeCounts entry) are assigned as close a possible to every odd occurrence of the period. This helps to ensure that the outside placeholders are positioned half of a period from the outside edge, instead of a whole period, which reduces the maximum distance between differing elements at the boundary.

The final vector is populated based on substituting each placeholder in the temporary vector with a segment from a rotating "wheel" list of the values associated with that group. For example, if the input vector has 3 B's, C's, and D's, the arranged likeCount wheel would be (B, C, D). Scanning from left to right, across the vector, the 3-grouping placeholder value would be replaced with B, C, D, . . . B, C, D, . . . B, C, D. This second vector allows the order to be reversed for any placements to the right of center, which enables the placement to be more symmetric (e.g., B, C, D, . . . B, C, D, . . . D, C, B). This can be helpful, when a user desires a single occurrence of the CCU, and there will not be a second row in the CCU.

An exemplary implementation of the foregoing distribution algorithm is provided below according to the following SKILL code procedure:

```
procedure(distribute14(input @optional symmetric verbose) ; tbowen 3231
    let((count last vector finalVector period output desired likeCount rotary wheel sizeOfLikeCounts keys center)
        count = makeTable("number of element occurrences keyed by element" 0)
        likeCount = makeTable("lists of elements with equal counts keyed by count value" nil)
        sizeOfLikeCounts = makeTable("number of families with the same count keyed by count" nil)
        ;; tabulate number of occurrences for each element type
        foreach(e input
            count[e] = count[e] + 1
        )
        ;; tabulate all element types that share the same number of occurrences
        foreach(key count
            likeCount[count[key]] = cons(key likeCount[count[key]])
        )
        ;; tabulate the number of element types that share the same
        ;; number of occurrences for each number of occurrences
        foreach(key likeCount
            sizeOfLikeCounts[key] = length(likeCount[key])
            wheel = nil
            last = 0
            foreach(e sort(likeCount[key] 'lessp)
                if(evenp(++last)
                    then
                        wheel = append1(wheel e)
                    else
                        wheel = cons(e wheel)
                ) ; ** if evenp **
            ) ; ** foreach e **
            likeCount[key] = wheel
        )
        ;; sort possible occurrence numbers in ascending order
        keys = sort(keys(likeCount) 'lessp)
        verbose && printf("keys = %L\n" keys)
        ;; initialize vector and first/last pointers to the ends of the vector
        last = length(input) − 1
        center = last / 2.0
        vector = makeVector(last+1 nil)
        finalVector = makeVector(last+1 nil)
        ;; iterate through all the possible numbers of occurrences
        foreach(number keys
            ;; calculate ideal period for *double* frequency
            period = float(last) / float(2*number)
            verbose && printf("- %L => period = %L\n" number period)
            ;; visit every odd period point
            for(k 0 number−1
                desired = (2.0*k + 1)*period
                verbose && printf(" k=%L - desired = %L\n" k desired)
                ;; place an "occurrence number" in the closest available
                ;; spot for each type that shares the same number of occurrences
                for(i 1 sizeOfLikeCounts[number]
                    verbose && printf(" - i=%L %L=>%L\n " i desired getClosestEmptySlot(vector desired))
                    verbose && printVector(vector)
                    vector[getClosestEmptySlot(vector desired)] = number
                )
            ) ; ** for k **
        ) ; ** foreach number **
        verbose && printf("ROTATING!!!\n")
        ;; iterate through all the possible number of occurrences
        foreach(number keys
            ;; initialize rotary of all elements types that shared this number of occurrences
            wheel = rotary = likeCount[number]
            verbose && printf("- %L; wheel = %L\n" number wheel)
            ;; run through the whole vector...
            for(k 0 last
                ;; placing the next element in the rotary, if corresponding occurrence-number marker is found
                when(vector[k] == number
                    finalVector[k] = car(rotary)
                    ;; move to next position in rotary...
                    unless(rotary = cdr(rotary)
                        ;; or start over, if rotary is empty
```

```
                    if(symmetric && (k+1 > center)
                        then
                            ;; on right half of vector, place elements
in reverse order to improve symmetry
                                rotary = reverse(wheel)
                            else
                                ;; place elements according to original
order of the wheel
                                rotary = wheel
                        ) ; ** if symmetric **
                    ) ; ** unless rotary **
                ) ; ** when vector **
            ) ; ** for k **
        ) ; ** foreach number **
        ;; translate vector into list
        for(k 0 last
            output = cons(finalVector[last−k] output)
        )
        ;; return distributed list
        output
    ) ; ** let **
) ; ** procedure distribute14 **
```

Figure 7:
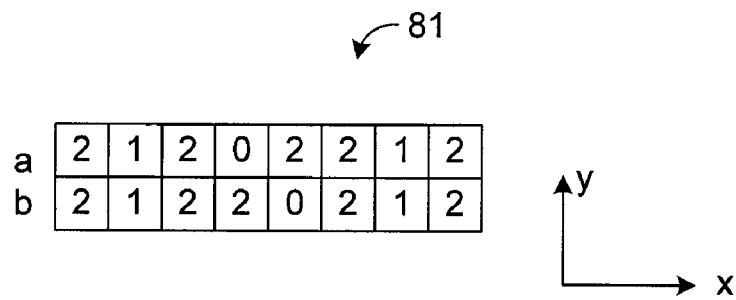
FIG. 7 is a block diagram illustrating an exemplary array that may be created by a layout design system, such as is depicted in FIG. 3, using the common centroid unit of FIG. 5 according to a tiling algorithm described in FIG. 10.
Figure 8:
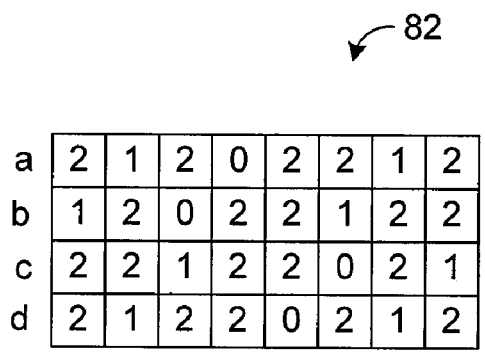
FIG. 8 is a block diagram illustrating an exemplary array that may be created by a layout design system, such as is depicted in FIG. 3, using the common centroid unit of FIG. 5 according to a tiling algorithm described in FIG. 10.
Figure 9:
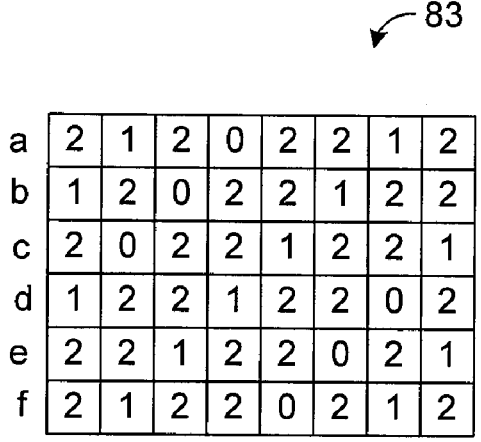
FIG. 9 is a block diagram illustrating an exemplary array that may be created by a layout design system, such as is depicted in FIG. 3, using the common centroid unit of FIG. 5 according to a tiling algorithm described in FIG. 10.

Referring again to FIG. 5, it should be noted that the dimensions of the segments 73-80 can be dependent on several factors. For example, the dimensions are based on the number of segment rows and columns for the layout design, as well as the "gate length" and "total gate width," which can be specified by a user. For the final layout design, the number of "segment rows" refers to the number of rows of tiled CCU's, which degenerate into the number of rows of device segments for the single-row CCU case. For example, FIG. 7 shows a final layout design having an array 81 of two rows a and b, FIG. 8 shows a final layout design having an array 82 of four rows, and FIG. 9 shows a final layout design having an array 83 of six rows. Note that, in the instant embodiment, each row has the same number of device segments.

The number of "segment columns" refers to the number of times that the CCU 72 is replicated in each row. In FIGS. 7-9, each row has only one CCU 72. Thus, in each of these examples, the column number is one. FIG. 11, which will be described in more detail later, shows an example in which each row has two CCUs 72, and the column number for this example is, therefore, two. Since the number of segments in each row is the same in the instant embodiment, each row has the same number of columns.

Referring to FIG. 4, the "gate length" refers to the length (in the x-direction) of each segment. In addition, the "total gate width" refers to the sum of the segment widths (in the y-direction) per device. Thus, the sum of the widths (in the y-direction) of all of the segments of device 0 equals the "total gate width" of device 0, which is computed similarly for each device 0-2.

Moreover, knowing the number of segment rows and columns for the final layout design, as well as the gate length and total gate width, the design logic 52 can calculate the segment dimensions to be used in the layout design. Note that the segment dimensions can change as the segment rows, segment columns, gate length, and/or total gate width change. Further, in the instant embodiment, the segments are of the same size.

In one exemplary embodiment, the design logic 52 is configured to use, as a default, values of 2 and 1 for the segment rows and segment columns, respectively. Thus, unless a user specifies a different number of segment rows and/or columns, the final layout design has two rows and one column. In other embodiments, other default values are possible.

Figure 10:
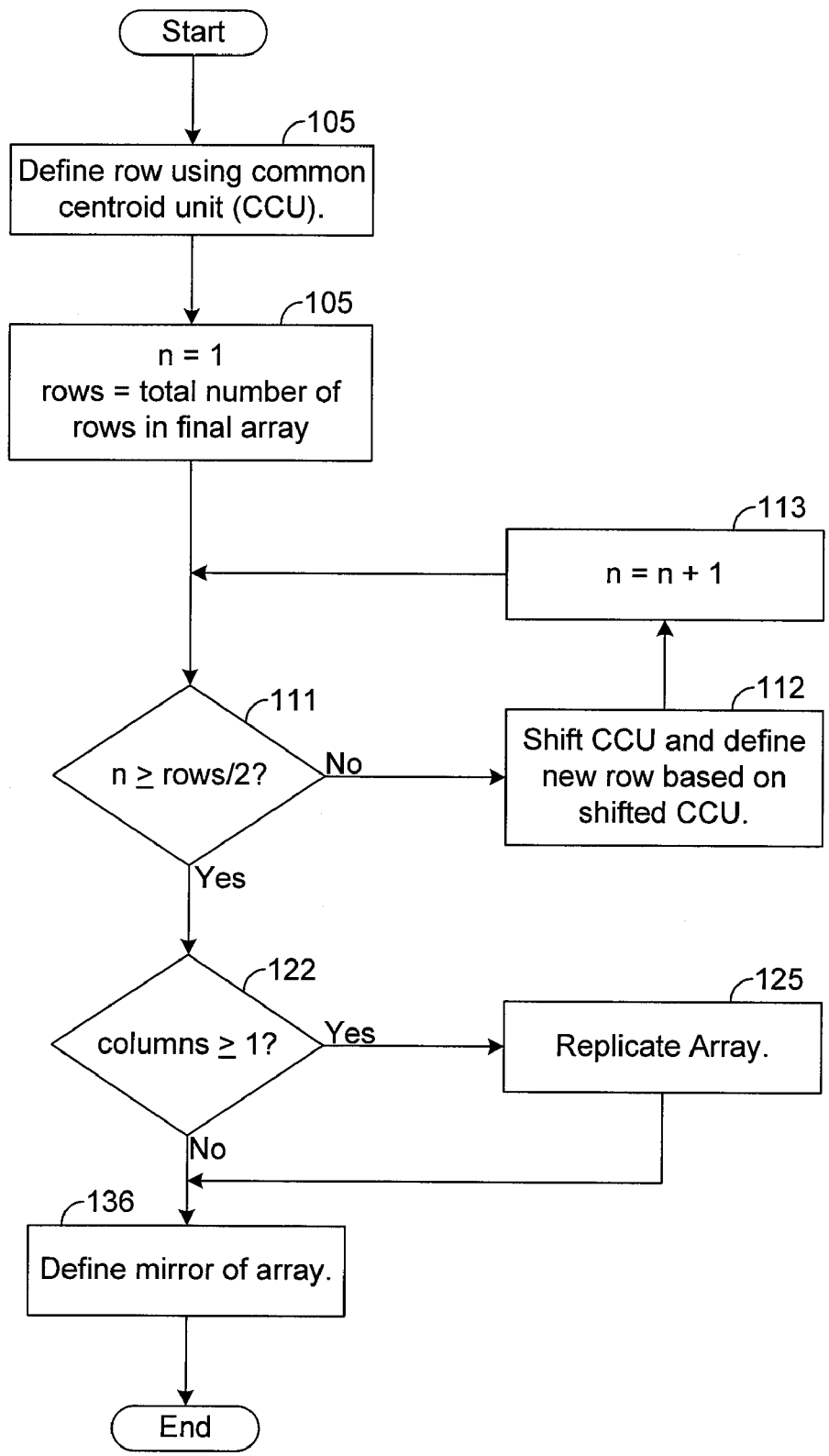
FIG. 10 is a flow chart illustrating an exemplary method for generating a common centroid layout in accordance with an exemplary embodiment of the present disclosure.

In one exemplary embodiment, the design logic 52 generates a layout by tiling the CCU 72 according to the methodology depicted by FIG. 10. In this regard, referring to FIGS. 7 and 10, the design logic 52 defines the first row (i.e., row a), as depicted by block 105 of FIG. 10, such that it matches the CCU 72. For example, the design logic 52 may define the row a by copying the CCU 72. In this regard, as can be seen by comparing row a of FIG. 7 to the CCU 72 shown by FIG. 5, row a has the same segment order as the CCU 72.

After defining row a, the design logic 52 adds an additional row until half of the final array is completed. For each new row, the design logic 52 shifts the CCU 72 by one segment and then defines the new row such that it matches the shifted CCU 72. For example, the design logic 52 may define the new row by shifting the CCU 72 and then copying the shifted CCU 72. In the example shown by FIG. 10, the design logic 52 initializes a variable, n, to a value of 1 in block 107. The design logic 52 also initializes a variable, rows, equal to the total number of rows in the final array 81. As shown by blocks 111-113, the design logic 52 adds additional rows and increments n for each additional row until n is greater than or equal to rows divided by two.

In example shown by FIG. 7, there are only two total rows in the final array 81, and rows is, therefore, equal to 2. Thus, a "yes" determination is initially made in block 111 and block 112 is not performed. Accordingly, upon a "yes" determination in block 111, only row a has been defined.

However, in the example shown by FIG. 8, there are four total rows in the array 82. Thus, one additional row (i.e., row b) is added via block 112. In this regard, in implementing block 112, the design logic 52 shifts the CCU 72 by one segment such that the second segment 74 (FIG. 5) of the CCU 72 becomes the first segment of the row b and the first segment 73 of the CCU 72 becomes the last segment of the row b. Each additional row is formed the same way via block 112. Thus, in the example shown by FIG. 9 in which two additional rows (i.e., rows b and c) are defined via block 112, the row c has the segment order of the preceding row (i.e., row b) shifted by one segment.

Upon a "yes" determination in block 111, the design logic 52 determines whether more than one column has been specified, as shown by block 122. If so, the design logic 52 replicates the current array to add columns thereby increasing the length of each row depending on the number of columns that are specified, as shown by block 125. In the examples shown by FIGS. 7-9, each of the arrays 81-83 has only one column. Thus, a "no" determination is made in block 122, and block 125 is skipped. However, assume that in the example shown by FIG. 9, two columns have been specified. FIG. 11, depicts an exemplary array 132 that is defined via the methodology shown by FIG. 10 through block 125 (i.e., after block 125 but before block 136). In this regard, via implementation of block 125, rows a-c shown by FIG. 9 are lengthened by duplicating these rows once for every additional column to be added. In the example shown by FIG. 11, only one additional column has been added.

Upon a "no" determination in block 122 or upon implementation of block 125, whichever occurs, half of the final array is complete. As shown by block 136 of FIG. 10, the design logic 52 defines the remaining half of the final array by creating a mirror of the first half about the x-axis and y-axis. There are various techniques that may be used to create a mirror of an array. In one embodiment, the design logic 52 copies each row in reverse order and then reverses the segment order of the copied row.

For example, in FIG. 7, only row a represents the first half of the array 81 that has been created prior to block 136. In implementing block 136, the design logic 52 copies row a and reverses the segment order of row a to define row b, which represents the second half of the array 81. Further, the array halves are appended.

In the example of FIG. 8, rows a and b represent the first half of the array 82 that has been created prior to block 136. In implementing block 136, the design logic 52 defines the first row (i.e., row c) of the second array half by copying the last row (i.e., row b) of the first array half and then reversing the segment order for this row c. The design logic 52 then defines the next row (i.e., row d) of the second array half by copying the next row (i.e., row a) of the first array half and reversing the segment order.

In the example of FIG. 9, rows a, b, and c represent the first half of the array 83 that has been created prior to block 136. In implementing block 136, the design logic 52 defines the first row (i.e., row d) of the second array half by copying the last row (i.e., row c) of the first array half and then reversing the segment order for this row d. The design logic 52 then defines the next row (i.e., row e) of the second array half by copying the next row (i.e., row b) of the first array half and reversing the segment order. The design logic 52 does the same for each row to be added until the array 83 is complete. Thus, the design logic 52 defines row f by copying row a and reversing the segment order for row f. FIG. 12 shows the final array 141 for the example shown by FIG. 11.

Figure 13:
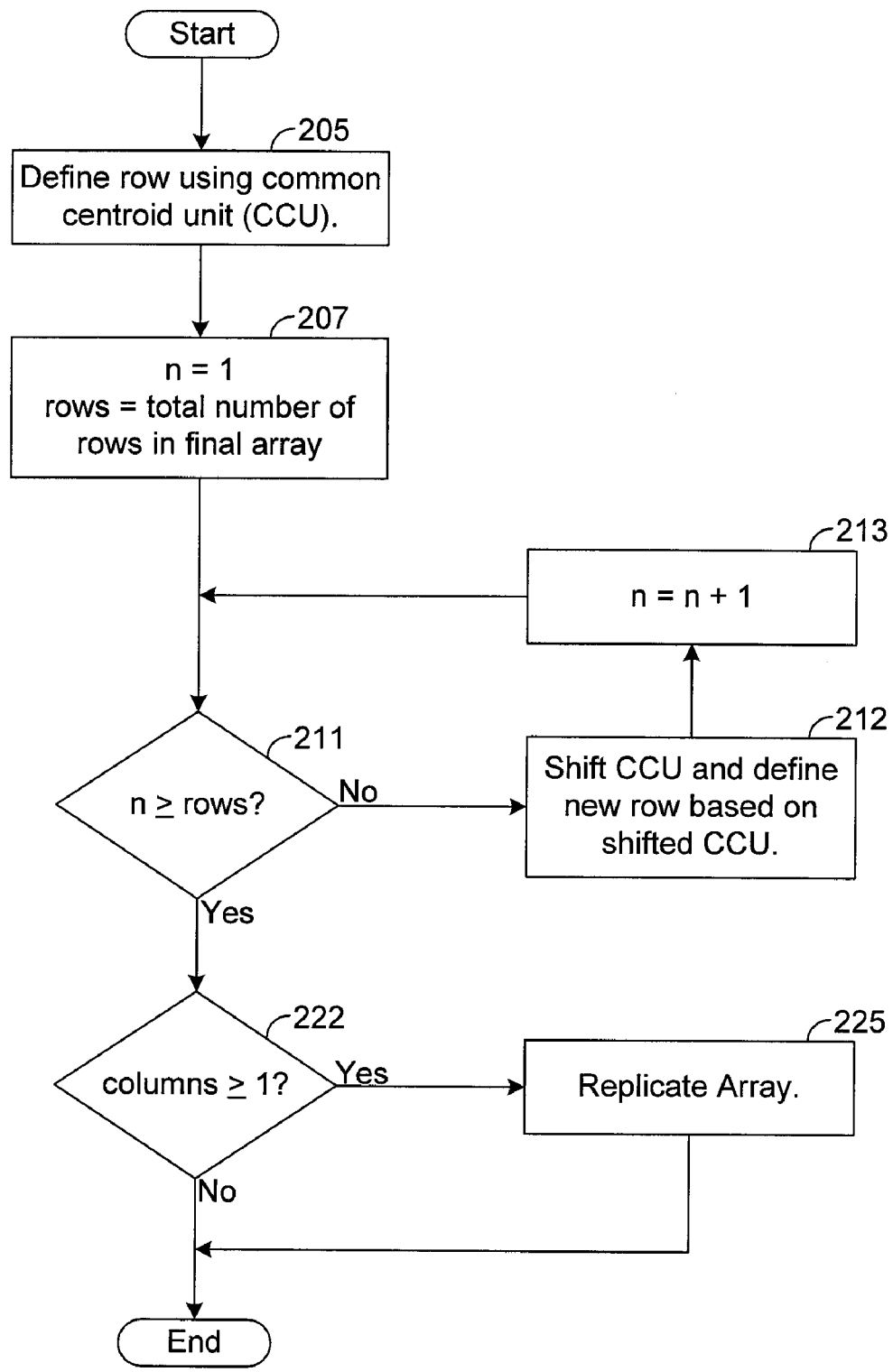
FIG. 13 is a flow chart illustrating an exemplary method for generating a common centroid layout in accordance with an exemplary embodiment of the present disclosure.

Since the methodology of FIG. 10 creates a final array by defining a first half of the array and then mirroring the first half to define the second half of the array, the methodology is suitable when the final array is to have an even number of rows. In at least one embodiment, the design logic 52 is configured to select which algorithm is used to tile the CCU 72 depending on the total number of rows that are to be in the final array. FIG. 13 depicts an exemplary methodology that may be used when the total number of rows in the final array is evenly divisible by the segment length of the CCU 72. For example, if the CCU 72 has eight segments, then the methodology of FIG. 13 may be used if the number of rows in the final array is to be 8, 16, 24, 32, or other number greater than 32 that is evenly divisible by 8.

Figures 14, 15, 16:
FIG. 14 is a block diagram illustrating an exemplary array that may be created by a layout design system, such as is depicted in FIG. 3, using the common centroid unit of FIG. 5 according to a tiling algorithm described in FIG. 13.
FIG. 15 is a block diagram illustrating an exemplary array that may be created by a layout design system, such as is depicted in FIG. 3, using the common centroid unit of FIG. 5 according to a tiling algorithm described in FIG. 13.
FIG. 16 is a block diagram illustrating an exemplary array that may be created by a layout design system, such as is depicted in FIG. 3, using the common centroid unit of FIG. 5 according to a tiling algorithm described in FIG. 13.

In this regard, the design logic 52 defines the first row, as depicted by block 205 (i.e., row a) of FIG. 13, such that it matches the CCU 72. For example, the design logic 52 may define the row a by copying the CCU 72. As a mere example, FIG. 14 shows an exemplary eight-row array 206 formed by the methodology depicted by FIG. 13 using the CCU 72 of FIG. 5 when the column number is one. In this regard, as can be seen by comparing row a of FIG. 14 to the CCU 72 shown by FIG. 5, row a has the same segment order as the CCU 72.

After defining row a, the design logic 52 adds an additional row until the array is completed. For each new row, the design logic 52 shifts the CCU 72 by one segment and then defines the new row such that it matches the shifted CCU 72. For example, the design logic 52 may define the new row by shifting the CCU 72 and then copying the shifted CCU 72. In the example shown by FIG. 13, the design logic 52 initializes a variable, n, to a value of 1 in block 207. The design logic 52 also initializes a variable, rows, equal to the total number of rows in the final array. As shown by blocks 211-213, the design logic 52 adds additional rows and increments n for each additional row until n is greater than or equal to rows.

In the example shown by FIG. 14, there are eight total rows in the array 206. Thus, seven additional rows (i.e., row b-h) are added via block 212. In this regard, in defining row b, the design logic 52 shifts, by one segment, the CCU 72 that was used to define row a such that the second segment 74 of the CCU 72 becomes the first segment and the first segment 73 of CCU 72 becomes the last segment. The design logic 52 then copies the shifted CCU 72 to form row b. In defining row c, the design logic 52 shifts, by one segment, the CCU 72 that was used to define row b and copies the shifted CCU 72 to form row c. Further, in defining row d, the design logic 52 shifts, by one segment, the CCU 72 that was used to define row c and copies the shifted CCU 72 to form row d. The design logic 52 continues defining additional rows by shifting and copying the CCU 72 in the same manner until all of the rows of the final array have been defined or, in other words, until n is greater than or equal to rows.

Upon a "yes" determination in block 211, the design logic 52 determines whether more than one column has been specified, as shown by block 222. If so, the design logic 52 replicates the current array to add columns thereby increasing the length of each row depending on the number of columns that are specified, as shown by block 225. In the example shown by FIG. 14, array 206 has only one column. Thus, a "no" determination is made in block 222, and block 225 is skipped.

However, assume that, instead, two columns have been specified. In such an example, the design logic 52 constructs the array 206 shown in FIG. 14 according to the techniques described above. The design logic 52 then copies the array 206 and appends a copy of the array 206, thereby lengthening the rows, as depicted by FIG. 15. If more columns are specified, the design logic 52 appends additional array copies. For example, FIG. 16 shows an example in which three columns have been specified.

Note that it is believed that arrays constructed according to the exemplary tiling algorithm depicted by FIG. 13 generally mitigate the effects of non-linear process variations better than arrays constructed according to the exemplary tiling algorithm depicted by FIG. 10. Accordingly, the design logic 52 is configured to use the techniques of FIG. 13 when the number of rows in the final array is evenly divisible by the number of segments in the CCU 72 even though the techniques of FIG. 10 could otherwise be used. Thus, before selecting the tiling algorithm to be used, the design logic 52 first checks to see if the number of rows in the final array is evenly divisible by the number of segments in the CCU 72. If so, the design logic 52 selects the tiling algorithm of FIG. 13. If not, the design logic 52 selects the tiling algorithm of FIG. 10.

Constructing an array according to the tiling algorithms described above with reference to FIG. 10 or FIG. 13 provides a layout in which each device has a common centroid. Not only do such techniques provide a common centroid layout but they do so with relatively simple computations and low complexity. Further, the techniques are scalable such that they can be applied to objects of various sizes and device types. Indeed, the techniques can be applied to large objects or objects having a large number of devices without significantly increasing the complexity of the computations and data manipulations.

Upon constructing a common centroid layout according to techniques described herein, the design logic 52 stores data 251 (FIG. 3), referred to herein as "design data," defining the common centroid layout that has been constructed. The wiring logic 54 then defines connection paths for the conductive connections, sometimes referred to as "traces," that are to connect the device segments represented by the design data 251. The wiring logic 54 may modify the design data 251 such that it defines not only the respective positioning of the device segments forming the object being modeled but also the associated connection paths. Thus, an IC chip manufacturer, based on the design data 251, can form the object being modeled on an IC chip, wherein the devices of the object have a common centroid thereby mitigating the effects of various linear and/or non-linear process variations.

Techniques for adding connection paths, referred to as "wiring techniques," to layout designs are generally well-known, and any known or future-developed wiring technique may be used by the wiring logic 54. U.S. Provisional Patent Application No. 60/838,084, entitled "A Systematic Method for Wiring Common-Centroid Cells," and filed on Aug. 16, 2006, which is incorporated herein by reference, describes exemplary wiring techniques that may be used by the wiring logic 54.

In some situations, a user may desire for the array width to be less than one column. In such situations, the design logic 52 is configured to break the CCU 72 into multiple rows before tiling. In a preferred embodiment, each row has the same number of segments. Thus, the number of rows in the broken CCU 72 is preferably evenly divisible into the segment length of the original CCU 72. In the example depicted by FIG. 5 in which the CCU 72 has eight segments 73-80, the CCU 72 can be broken into two rows of four segments or four rows of two segments. FIG. 17 shows the CCU 72 of FIG. 5 for an example in which the CCU 72 has been broken into two rows, and FIG. 18 shows the CCU 72 of FIG. 5 for an example in which the CCU 72 has been broken into four rows. Each row of a broken CCU 72 shall be referred to hereafter as a "sub-unit" of the CCU 72.

In breaking the CCU 72, the design logic 52 stacks the sub-units and maintains the order of the segments 73-80 on a sub-unit by sub-unit basis. In this regard, the first sub-unit of the broken CCU 72 (i.e., row a in FIG. 18) has the first two consecutive segments 73 and 74 of the CCU 72. Further, the next sub-unit (i.e., row b) has the next two consecutive segments 75 and 76, and row c has the next two consecutive segments 77 and 78. Finally, the last sub-unit (i.e., row d) has the last two consecutive segments 79 and 80.

However, the segment order for every other sub-unit is reversed relative to the order of the original CCU 72 prior to breaking. For example, as can be seen by comparing FIG. 18 to FIG. 5, every other sub-unit (i.e., rows b and d) has its segment order reversed. In this regard, segment 75 was positioned before segment 76 in the original CCU 75 but is positioned after segment 76 in the broken CCU 72. Further, segment 79 was positioned before segment 80 in the original CCU 72 but is positioned after segment 80 in the broken CCU 72. Thus, the original segment order generally follows the reference arrows depicted in FIG. 18.

Reversing the order of every other sub-unit helps to preserve the even distribution property of the CCU 72, thereby helping the layout to resist non-linear process variations. However, instead of reversing every other sub-unit, it is possible for the design logic 52 to redistribute the segments using a multi-dimensional grouping or dispersal algorithm.

After breaking the CCU 72, the design logic 52 tiles the broken CCU 72 according to the tiling techniques described herein. In this regard, the design logic 52 selects either the tiling algorithm depicted by FIG. 10 or the tiling algorithm depicted by FIG. 13 depending on the total number of rows for the final array. In shifting the CCU 72 in such algorithms, the segments are shifted consistent with the original segment order of the broken CCU 72. For example, as described above in the example of FIG. 18, the reference arrows indicate the general flow of the original segment order of the broken CCU 72. FIG. 19 shows the array of FIG. 18 after a shifted copy of the CCU 72 has been added via block 112 of FIG. 10 to define additional rows e-h. As can be seen by comparing FIGS. 18 and 19, the original segment order of the newly copied array (i.e., rows e-h) is shifted by one segment in FIG. 19, as compared to the original CCU (i.e., rows a-d), but is otherwise preserved.

An exemplary use and operation of the system 50 is described below with particular reference to FIG. 20.

Figure 20:
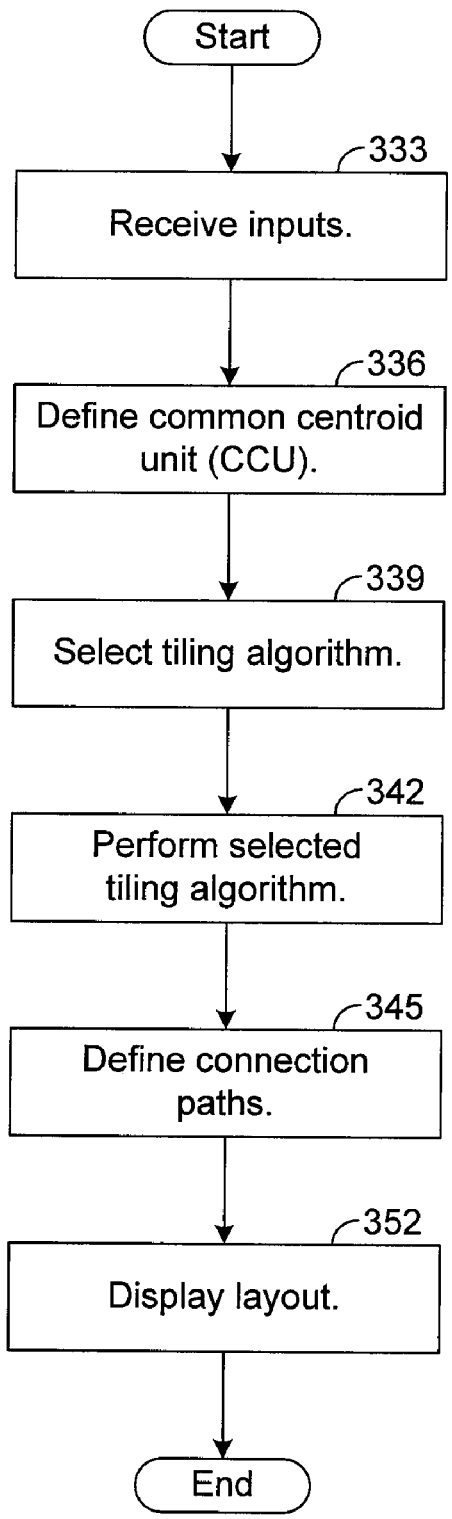
FIG. 20 is a flow chart illustrating an exemplary method performed by a layout design system, such as is depicted in FIG. 3.

A user, via input device 65 (FIG. 3), provides various inputs, which are received by the design logic 52, as shown by block 333 of FIG. 20. In one exemplary embodiment, the inputs include the number of rows and columns of the final array, as well as whether the CCU 72 is to be broken. The inputs also include the number of devices for the object being modeled and the size of each device. Based on such inputs, the design logic 52 defines a CCU 72 according to the techniques described above, as shown by block 336 of FIG. 20. For illustrative purposes, assume that the design logic 52 defines the CCU 72 shown by FIG. 5. Further assume that the user specifies that the final array is to have eight rows and one column.

As shown by block 339 of FIG. 20, the design logic 52 selects the tiling algorithm to be used to tile the CCU 72 based on the number of segments in the CCU 72 and the number of rows for the final array specified by the user. In this regard, the design logic 52 determines whether the number of rows for the final array is evenly divisible by the number of segments in the CCU 72. In the instant example, the number of rows is indeed evenly divisible by the number of segments. Thus, the logic 52 selects the tiling algorithm of FIG. 13. In other cases in which the number of rows is not evenly divisible by the number of segments, the design logic 52 selects the tiling algorithm of FIG. 10 if the number of rows in the final array specified by the user is even. If the number of rows is odd and is not evenly divisible by the number of segments, then the design logic 52 can be configured to use another tiling algorithm or inform the user that he or she should specify another number of rows.

As depicted by block 342 of FIG. 20, the design logic 52 performs the tiling algorithm selected in block 339 thereby generating a common centroid layout. In the instant example, the design logic 52 tiles the CCU 72 according to the tiling algorithm of FIG. 13 to define the array depicted by FIG. 14, which represents a common centroid layout for the device segments of the object being modeled. In this regard, by arranging device segments according to the array generated by the design logic 52, each of the devices represented by the layout has a common centroid. The design logic 52 stores, in memory, design data 251 (FIG. 3) defining such array and, in particular, indicating the respective position of each device segment within the array.

As shown by block 345, the wiring logic 54 updates the data 251 to add connection paths to define a complete common centroid layout that not only indicates the positions of each device segment but also the connection paths for the traces to be connected to the device segments. As shown by block 352, design logic 52 displays the data 251 to a user. For example, the data 251 may be electronically displayed or printed via output device 66 (FIG. 3). Alternatively or in addition to block 352, the design logic 52 may transmit the data to a system for manufacturing IC chips to enable the system to manufacture an object according to the layout defined by the data 251. Moreover, if the object being modeled is formed on an IC chip according to the segment arrangement indicated by the data 251, then the devices of the object should have a common centroid helping to mitigate the effects of process variations during manufacturing.

Now, therefore, the following is claimed:

1. A system for designing layouts for integrated circuits, comprising:
    an input device configured to receive at least one input pertaining to a circuit design of at least one integrated circuit (IC) object; and
    logic configured to define, based on the input, a tiling unit to be tiled for generating at least a portion of a layout design for the IC object, the tiling unit representing segments of devices that define the IC object, wherein the segments represented by the tiling unit do not have a common centroid, the logic configured to tile the tiling unit to automatically generate a plurality of tiled arrays that form the portion of the layout design for the IC object such that the devices of the IC object have a common centroid, each of the tiled arrays formed by a respective tiling of the tiling unit, wherein the logic, by tiling the tiling unit, is configured to generate a plurality of tiled arrays that form at least a first portion of the layout design, each of the tiled arrays having a respective segment order, wherein the respective segment order of each of the tiled arrays is different than the segment order of an adjacent one of the tiled arrays.

2. The system of claim 1, further comprising an output device, wherein the logic is configured to display the layout design via the output device.

3. The system of claim 1, wherein the logic is configured to select a tiling algorithm based on the input and to tile the tiling unit according to the selected tiling algorithm.

4. The system of claim 3, wherein the input indicates a total number of rows of device segments for the IC object.

5. The system of claim 3, wherein the logic is configured to determine, based on the input, whether a total number of rows of the IC object is evenly divisible by a total number of segments in the array.

6. The system of claim 1, wherein the logic is configured to generate a first portion of the layout design and to generate a second portion of the layout design based on the first portion, and wherein the second portion mirrors the first portion.

7. The system of claim 6, wherein the first portion has a plurality of tiled arrays, each of the tiled arrays of the first portion having a segment order, wherein one of the tiled arrays in the first portion is mirrored by an array in the second portion, the array in the second portion having a segment order reversed relative to the segment order of the one tiled array in the first portion.

8. The system of claim 1, wherein the tiling unit has at least one respective entry corresponding to each device in the IC object, and wherein a total number of entries in the tiling unit corresponding to one of the devices in the IC object is based on a size of the one object relative to sizes of other devices in the IC object.

9. The system of claim 1, wherein the respective segment order of each of the tiled arrays is shifted relative to the segment order of the adjacent one of the tiled arrays.

10. The system of claim 1, wherein the respective segment order of each of the tiled arrays is shifted by one segment relative to the segment order of the adjacent one of the tiled arrays.

11. The system of claim 1, wherein the logic is configured to generate a second portion of the layout design based on the first portion, each of the tiled arrays in the first portion corresponding to a respective array in the second portion, the respective array in the second portion having a segment order reversed relative to the segment order of the corresponding tiled array in the first portion.

12. The system of claim 1, wherein the tiling unit represents segments of at least three devices that define the IC object.

13. The system of claim 12, wherein one of the at least three devices has a size that is different than a size of another of the at least three devices.

14. A system for designing layouts for integrated circuits, comprising:
    an input device configured to receive at least one input pertaining to a circuit design of at least one integrated circuit (IC) object; and
    logic configured to define, based on the input, a tiling unit to be tiled for generating at least a portion of a layout design for the IC object, the tiling unit representing segments of devices that define the IC object, the logic configured to tile the tiling unit to automatically generate a plurality of tiled arrays that form the portion of the layout design for the IC object such that the devices of the IC object have a common centroid, each of the tiled arrays formed by a respective tiling of the tiling unit, wherein the tiling unit has a segment order, wherein the plurality of tiled arrays includes a first tiled array and a second tiled array that is adjacent to the first tiled array, and wherein the logic is configured to change the segment order of the tiling unit between a tiling of the tiling unit to create the first tiled array and a tiling of the tiling unit to create the second tiled array such that the first tiled array has a segment order different than a segment order of the second tiled array.

15. The system of claim 14, wherein tiling unit represents segments of at least three devices of the IC object.

16. The system of claim 14, further comprising an output device, wherein the logic is configured to display the layout design via the output device.

17. The system of claim 14, wherein the segments represented by the tiling unit do not have a common centroid.

18. The system of claim 14, wherein the logic is configured to shift the segment order of the tiling unit at least once between the tiling of the tiling unit to create the first tiled array and the tiling of the tiling unit to create the second tiled array.

19. The system of claim 18, wherein the logic is configured to generate a second portion of the layout design based on the first portion, each of the tiled arrays in the first portion corresponding to a respective array in the second portion, the respective array in the second portion having a segment order reversed relative to the segment order of the corresponding tiled array in the first portion.

20. The system of claim 18, wherein each of the tiled arrays represents segments of at least three devices of the IC object.

21. The system of claim 14, wherein the segment order of the second tiled array is shifted relative to the segment order of the first tiled array.

22. A computer-readable medium storing a program, the program comprising:

logic for receiving at least one input pertaining to a circuit design of at least one integrated circuit (IC) object;

logic for defining, based on the input, a tiling unit to be tiled for generating at least a portion of a layout design, the tiling unit representing segments of devices that define the IC object, wherein the segments represented by the tiling unit do not have a common centroid; and logic for shifting and tiling the tiling unit thereby automatically generating a plurality of tiled arrays that form the portion of the layout design for the IC object such that the devices of the IC object have a common centroid, each of the tiled arrays having a respective segment order, wherein the respective order of each of the tiled arrays is different than the segment order of an adjacent one of the tiled arrays.

23. The computer-readable medium of claim 22, further comprising logic for displaying the layout design.

24. A method for designing layouts for integrated circuits, comprising the steps of:

receiving at least one input pertaining to a circuit design of at least one integrated circuit (IC) object;

defining, based on the input, a tiling unit to be tiled for generating at least a portion of a layout design, the tiling unit representing segments of devices that define the IC object, wherein the segments represented by the tiling unit do not have a common centroid;

shifting and tiling the tiling unit thereby automatically generating a plurality of tiled arrays that form the portion of the layout design for the IC object such that the devices of the IC object have a common centroid, each of the tiled arrays having a respective segment, wherein the respective order of each of the tiled arrays is different than the segment order of an adjacent one of the tiled arrays; and storing the layout design in memory.

25. The method of claim 24, further comprising the step of displaying the layout design.

26. The method of claim 24, further comprising the step of selecting a tiling algorithm for the tiling step based on the input.

27. The method of claim 24, wherein the layout design has a first portion and a second portion, the method further comprising the step of generating the second portion, the generating step comprising the step of mirroring the first portion.

28. The method of claim 24, further comprising the step of determining a number of entries for the tiling unit based on respective sizes of the devices.

29. A system for designing layouts for integrated circuits, comprising:

an input device configured to receive at least one input pertaining to a circuit design of at least one integrated circuit (IC) object; and logic configured to define, based on the input, a tiling unit representing segments of devices that define the IC object, the logic configured to tile the tiling unit to automatically generate a plurality of tiled arrays that form a portion of the layout design for the IC object such that the devices of the IC object have a common centroid, wherein the plurality of tiled arrays includes a first tiled array and a second tiled array, the first tiled array adjacent to the second tiled array, wherein the first tiled array is formed by a first tiling of the tiling unit, wherein the second tiled array is formed by a second tiling of the tiling unit, wherein the first tiled array has a first segment order for all segments of the first tiling, wherein the second tiled array has a second segment order for all segments of the second tiling, wherein the first segment order is different than the second segment order such that the first tiled array does not match the second tiled array.

30. The system of claim 29, wherein the plurality of tiled arrays includes a third tiled array that is adjacent to the second tiled array, wherein the third tiled array is formed by a third tiling of the tiling unit, wherein the third tiled array has a third segment order for all segments of the third tiling, wherein the third segment order is different than the second segment order such that the second tiled array does not match the third tiled array.

31. The system of claim 30, wherein the second segment order is shifted relative to the second segment order, and wherein the third segment order is shifted relative to the second segment order.

32. The system of claim 29, wherein the segments represented by the tiling unit do not have a common centroid.

* * * * *